United States Patent [19]

Piascinski

[11] Patent Number: 4,812,485

[45] Date of Patent: Mar. 14, 1989

[54] ULTRAVIOLET-RESISTANT NOISE-REDUCING MEMBER AND METHOD OF MAKING SAME

[75] Inventor: Joseph J. Piascinski, Leola, Pa.

[73] Assignee: RCA Licensing Corporation, Princeton, N.J.

[21] Appl. No.: 132,246

[22] Filed: Dec. 14, 1987

Related U.S. Application Data

[63] Continuation-in-part of Ser. No. 14,031, Feb. 12, 1987, abandoned.

[51] Int. Cl.⁴ ............................................. C08J 9/00
[52] U.S. Cl. .................................... 521/82; 521/89; 521/90; 521/92; 521/154
[58] Field of Search ..................... 521/154, 89, 90, 92, 521/82

[56] References Cited

U.S. PATENT DOCUMENTS

| | | | |
|---|---|---|---|
| 2,942,099 | 6/1960 | Goldstein | 240/1 |
| 3,592,112 | 7/1971 | Frey | 95/1 R |
| 3,923,705 | 12/1975 | Smith | 521/154 |
| 3,970,456 | 7/1976 | Branton | 96/36.1 |
| 4,189,545 | 2/1980 | Modic | 521/154 |
| 4,418,157 | 11/1983 | Modic | 521/154 |
| 4,562,120 | 12/1985 | Axelrod et al. | 428/469 |

Primary Examiner—Morton Foelak
Attorney, Agent, or Firm—Eugene M. Whitacre; Dennis H. Irlbeck; Vincent J. Coughlin, Jr.

[57] ABSTRACT

A noise-reducing foam member for prolonged exposure to ultraviolet radiation without degradation consists essentially of a major proportion of a room-temperature silicone rubber foaming material and minor proportions of a room-temperature foaming curing agent and at least two and preferably three ultraviolet stabilizing materials selected from the group consisting of carbon black, cerium oxide, 2(2'-hydroxy-3',5'-di-tert-amylphenyl) benzotriazole and zinc oxide.

The foam member is made by mixing together suitable quantities of the silicone rubber foaming material, the ultraviolet stabilizing materials and the curing agent. The mixture is then cured to provide the foam member.

2 Claims, 2 Drawing Sheets

ULTRAVIOLET-RESISTANT NOISE-REDUCING MEMBER AND METHOD OF MAKING SAME

This is a continuation-in-part of application Ser. No. 014,031, filed Feb. 12, 1987, now abandoned.

BACKGROUND OF THE INVENTION

The invention relates to an ultraviolet-resistant foam member which is used as a sound reducer in an exposure lighthouse. A number of methods are described for preparing such a member.

Exposure lighthouses that are used for producing mosaic-type viewing screens for cathode-ray tubes are described in the prior art; for example in U.S. Pat. Nos. 2,942,099 to N. R. Goldstein, 3,592,112 to H. R. Frey, 3,970,456 to T. W. Branton and 4,562,120 to R. H. Axelrod et al. Such lighthouses generally include a metal light box, a cooled, small-area lamp which emits both visible and ultraviolet light and opticl components for reflecting and refracting light from the lamp to a photosensitive layer on a support for a viewing screen. Except for the optical components, it is desirable that inner surfaces of the lighthouse carry a light-absorbent coating that reflects a minimum of light that is incident thereon in order to minimize light scattering. The lamp used in the lighthouse is strongly emissive at about 365 nanometers and has an output over the range of 200 to 750 nanometers. Additionally, the lamp generates a significant amount of heat such that some lighthouse parts reach temperatures above 700° C. The lamp may be either air cooled or water cooled, and while air cooling provides the simplest mechanical system, such air cooled systems produce a characteristic hissing noise which must be controlled to be in compliance with OSHA regulations. Prior art foams, such as polyurethane and silicone rubber, have cell-like structures which can absorb or dampen sound waves and are suitable as noise reducers. However, the above-described foam materials craze and become brittle after about 24 hours of exposure to the ultraviolet radiation of the lamp. The UV degradated foams cannot effectively absorb noise and begin to decompose and produce foam particles. These particles are deposited, for example, on the lighthouse optical components resulting in defects in the viewing screen.

SUMMARY OF THE INVENTION

A noise-reducing foam member which is exposed to ultraviolet radiation without degradation consists essentially of a major proportion of a room-temperature foaming material and minor proportions of a room-temperature foaming catalyst and at least two ultraviolet stabilizing materials selected from the group consisting of carbon black, cerium oxide, 2-(2'-hydroxy-3',5'-di-tert-amylphenyl)benzotriazole and zinc oxide.

The foam member is made by mixing together suitable quantities of the foaming material, the ultraviolet stabilizing materials and the catalyst and then curing the mixture to provide the foam member.

DESCRIPTION OF THE PREFERRED EMBODIMENTS

Figure 1:
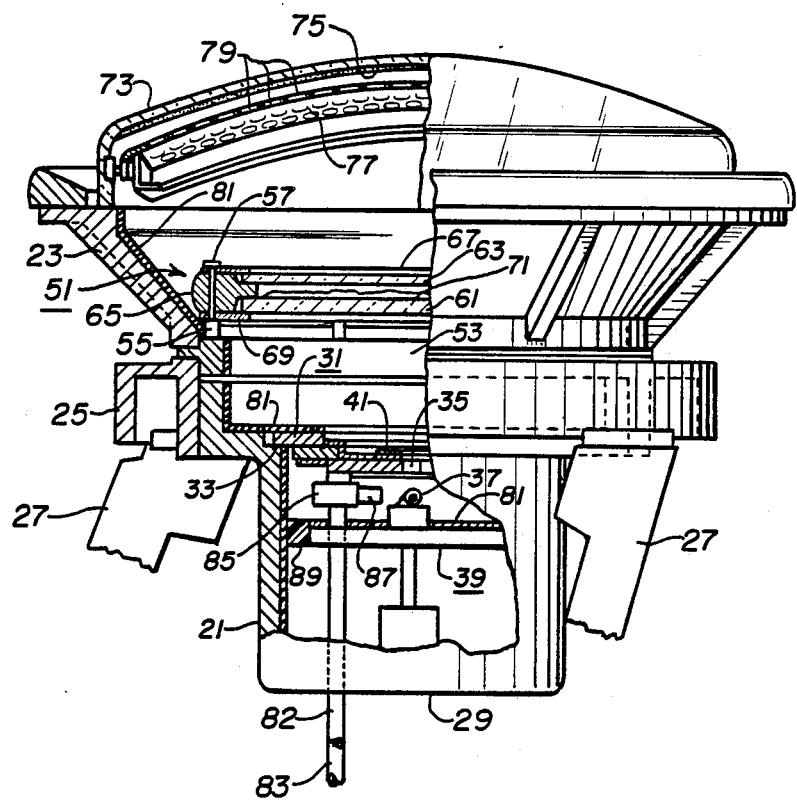
FIG. 1 is a partially broken-away elevational view of an exposure lighthouse showing a portion of the novel foam member.

The novel foam member may be used in any sound-reducing application where the member is also exposed to prolonged ultraviolet radiation. One such use is an internal sound absorber in an exposure lighthouse, shown in FIG. 1, that is adapted for preparing viewing screens for use in a cathode-ray tube. The lighthouse comprises a light box 21 and a panel support 23 held in position with respect to one another on a base 25 and supported on legs 27 at a desired angle.

The light box 21 is a cylindrical cup-shaped casting that is closed at one end by an integral end wall 29. The other end of the light box 21 is closed by a plate assembly 31, which fits into a circular recess 33 in the box 21. The plate assembly 31 has an aperture 35 therethrough. A small-area light source, such as a high-pressure mercury vapor lamp 37, is supported below the aperture 35 by means of a support structure 39. A shutter 41 is provided above the aperture 35 to interrupt the light from the lamp 37 which is operated continuously to maximize the life of the lamp. The light output of the lamp ranges from 200 to 700 nanometers (ultraviolet to visible) and it emits strongly at 365 nanometers which is in the ultraviolet portion of the spectrum.

A lens assembly 51 is mounted on a support ring 53 and on standoff spacers 55 with bolts 57. The support ring 53 is clamped between the panel support 23 and the base 25. The lens assembly 51 includes a correction lens 61, a wedge lens 63, a separator ring 65, an upper clamp 67 and a lower clamp 69. The upper surface of the correction lens 61 carries an optical filter 71.

In one mode of operating the lighthouse, a faceplate panel 73 is placed on the panel support 23. The panel 73 has a layer 75 of light hardenable binder and phosphor particles (or matrix material) on its inner surface, and an apertured mask 77 mounted therein and spaced from the layer 75. To make an exposure, the shutter 41 is opened permitting the combination of visible and ultraviolet radiation from the operating lamp 37 to pass upward through a multiplicity of apertures 79 in the mask 77 and impinge upon the layer 75. When the desired exposure time for the layer 75 has elapsed, the shutter 41 is closed and the cycle is repeated, as is known in the art.

The visible and ultraviolet radiation from the lamp 37 is intense and there would be enough scattered visible and ultraviolet light to cause fogging and/or irregular exposure of the layer 75 unless the internal metal surfaces of the lighthouse are covered by a light absorbing coating 81. The coating 81 is described in U.S. Pat. No. 4,562,120 referenced above and incorporated herein for the purpose of disclosure.

Figure 2:
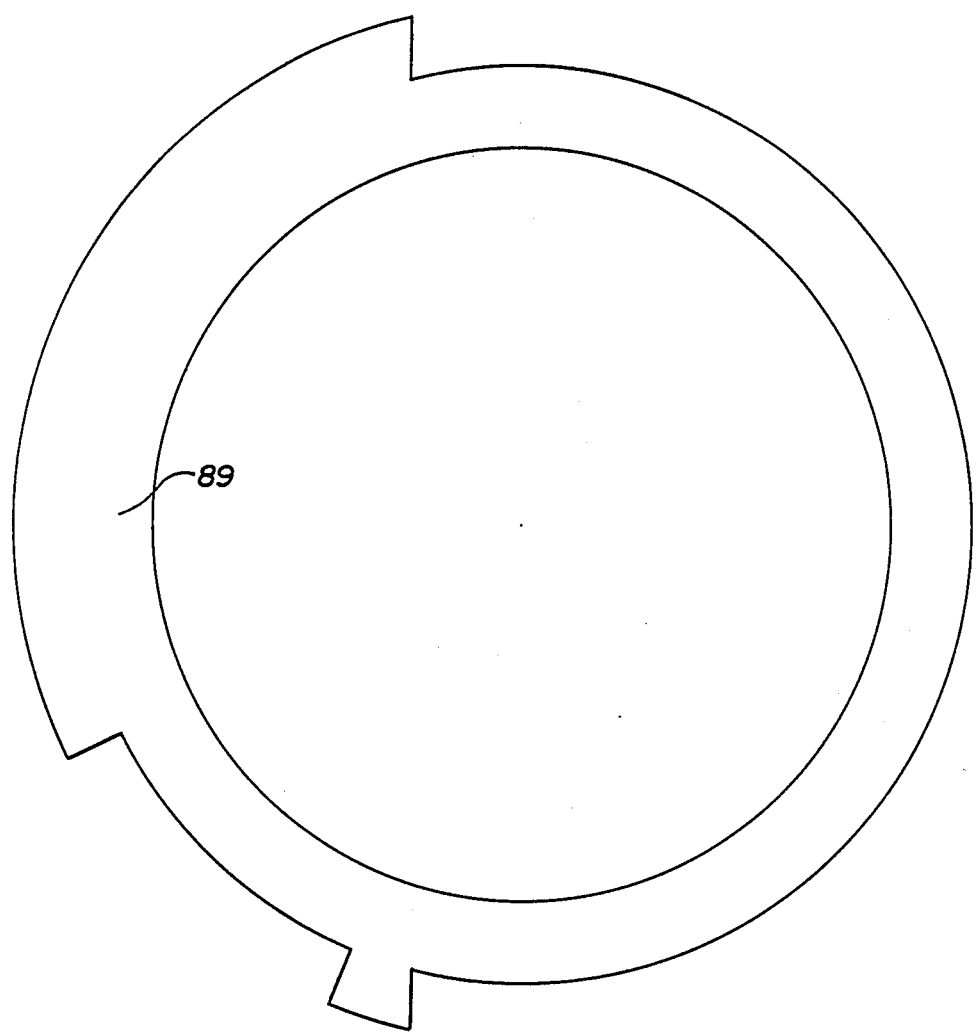
FIG. 2 is a plan view of the foam member shown in FIG. 1.
Figure 3:
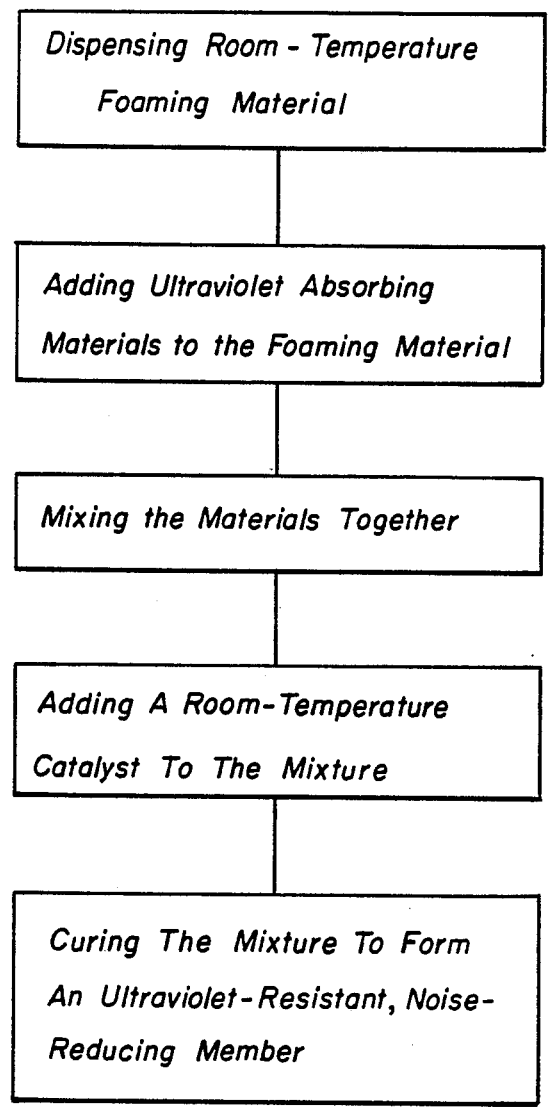
FIG. 3 is a flow chart showing the steps in making the novel foam member.

The considerable power dissipated by the lamp 37 requires that the lamp be cooled, for example by compressed air. Even with cooling, the heat and radiation from the lamp 37 causes the temperatures of all the metal parts to rise above 300° C. and in some areas, as high as 700° C. As shown in FIG. 1 a pair of air lines 82 and 83 extend through the end wall 29 of the light box 21 to a distributor block 85. A pair of nozzles 87 (only one of which is shown) extend from the distributor block 85 to the lamp 37. Each of the nozzles 87 is positioned adjacent to the oppositely disposed ends of the lamp 37. The compressed air exiting the nozzles 87 and impinging on the ends of the lamp 37 creates a hissing sound which must be suppressed or baffled to conform to existing OSHA noise standards. To this end, an ultraviolet-resistant, noise reducing foam member 89 is disposed around the periphery of the support structure 39 to restrict the air flow and to absorb the noise generated by air cooling. FIG. 2 shows a plan view of the foam member 89 which is configured to conform to the shape of the space between the interior sidewall of the light box 21 and the support structure 39. Preferably, the foam member 89 has a black or a grey color to further minimize the scattering of light from the lamp 37.

EXAMPLE I

A preferred formulation for producing the novel foam member 89, in weight parts and in weight percent (wt. %), is as follows:
- 25 grams (84.8 wt. %) of a room-temperature silicone rubber foaming material (RTF 762A base compound, available from General Electric Co., Waterford, N.Y.),
- 1.25 grams (4.2 wt. %) of zinc oxide (Fisher Scientific Co., Fair Lawn, N.J.),
- 0.5 grams (1.7 wt. %) of Vulcan XC-72, carbon black (Cabot Corp., Boston, Mass.),
- 0.25 grams (0.8 wt. %) of 2(2'-hydroxy-3',5'-di-tert-amylphenyl)benzotriazole (Tinuvin-328, available from Ciba-Geigy Corp., Ardsley, N.Y.) and
- 2.5 grams (8.5 wt. %) of a curing agent (RTF 762B, available from General Electric Co., Waterford, N.Y.).

In the foregoing formulation 25 grams of the RTF 762A forming material is dispensed into a suitable container. The ultraviolet stabilizing materials, comprising the zinc oxide, carbon black and 2-(2'-hydroxy-3',5'-di-tert-amylphenyl)benzotriazole, are added to the RTF 762A. The constituents are mixed together and then the RTF 762B curing agent is added and the mixing is continued until all the ingredients are thoroughly mixed. RTF 762 is General Electric's designation for a room temperature silicone rubber foaming material which is described in U.S. Pat. No. 4,418,157 issued on Nov. 29, 1983 and is incorporated by reference herein for the purpose of disclosure. The preferred material is described in example 2 of the patent and consists of a composition formed by combining about 75 parts by weight of a vinyl terminated dimethylpolysiloxane polymer and 0.0014 percent by weight vinyl content with 25 parts by weight of an organopolysiloxane copolymer comprising trimethyl siloxane units, methylvinyl siloxane units and $SiO_2$ units; 30 parts by weight of platinum catalyst per million parts by weight polysilicone polymer. An extending filler such as 40 parts by weight of 5 micron silica may be added. To 50 grams of the composition add 0.15 grams of water and 3.3 grams of organohydrogen-siloxane. After mixing for about 30 seconds the catalyzed mixture begins to foam and starts to gel. The mixture is then poured into a mold (not shown) to form a 7 inch square of foam that is 0.75 inch thick. After curing, the foam square is cut to form the foam member 89 shown in FIG. 2. Alternatively, the mold may be configured to form directly the member 89. The foam member 89 produced by this formulation has a black color for low reflectivity and exhibits superior ultraviolet stability, that is, the foam resists degradation for about one week or about seven times longer than conventional polyurethane and silicone rubber foams.

EXAMPLE II

An alternative formulation for producing the novel foam member 89 is as follows:
- 25 grams (82.5 wt. %) of the room-temperature silicone rubber foaming material described in example 1,
- 1.25 grams (4.1 wt. %) of zinc oxide (Fisher Scientific Co., Fair Lawn, N.J.,)
- 0.25 grams (0.8 wt. %) of carbon black (Vulcan XC-72, available from Cabot Corp., Boston, Mass.),
- 1.3 grams (4.3 wt. %) of 2(2'-hydroxy-3',5'-di-tert-amylphenyl)benzotriazole (Tinuvin-328, available from Ciba-Geigy Corp., Ardsley, N.Y.) and
- 2.5 grams (8.3 wt. %) of the curing agent described in example 1.

The components of the formulation are mixed as in Example I and cured to form the foam member 89. The resultant member has a grey body color and good ultraviolet stability.

EXAMPLE III

Another alternative formulation for producing the novel foam member 89 is as follows:
- 25 grams (85.8 wt. %) of the room-temperature silicone rubber foaming material described in example 1,
- 1.25 grams (4.3 wt. %) of zinc oxide (Fisher Scientific Co., Fair Lawn, N.J.),
- 0.25 grams (0.9 wt. %) carbon black (Vulcan XC-72, available from Cabot Corp., Boston, Mass.),
- 0.13 grams (0.4 wt. %) of 2(2'-hydroxy-3'5'-di-tert-amylphenyl)benzotriazole, (Tinuvin-328, available from Ciba-Geigy Corp., Ardsley, N.Y.) and
- 2.5 grams (8.6 wt. %) of the curing agent described in example 1.

The components of the formulation are mixed as in Example I and cured to form the foam member 89. The resultant member has a grey body and slightly poorer ultraviolet stability than the structure formed in Example II.

EXAMPLE IV

Yet another alternative formulation for producing the novel foam member 89 is as follows:
- 25 grams (86.4 wt. %) of the room temperature silicone rubber foaming material described in example 1,
- 1.25 grams (4.3 wt. %) of zinc oxide (Fisher Scientific Co., Fair Lawn, N.J.),
- 0.2 grams (0.7 wt. %) of carbon black (Vulcan XC-72, available from Cabot Corp., Boston, Mass.) and
- 2.5 grams (8.6 wt. %) of the curing agent described in example 1.

The ultraviolet stabilizers comprising zinc oxide and carbon black, are mixed with the foaming material. The catalyst is then added to the mixture and the mixing is continued until all of the ingredients are thoroughly blended. The mixture is molded as described in example I. The resultant foam member is slightly brittle and has a grey body color.

EXAMPLE V

A fifth formulation for producing the novel foam member 89 is as follows:
- 25 grams (83.3 wt. %) of RTF-762 foaming material (General Electric Co., Waterford, N.Y.), 1.25 grams (4.2 wt. %) of zinc oxide (Fisher Scientific Co., Fair Lawn, N.J.), 1.25 grams (4.2 wt. %) of cerium oxide (Lindsay Corp., American Potash & Chemical Co., West Chicago, Ill.) and 2.5 grams (8.3 wt. %) of RTF-762 catalyst (General Electric Co., Waterford, N.Y.).

The ultraviolet stabilizers comprising zinc oxide and cerium oxide, are mixed with the foaming material and then the catalyst is added and the mixing is continued until all of the ingredients are thoroughly mixed. The mixture is molded as described previously. The resultant foam member has a tan color and is not as ultraviolet resistant as the previously described foam members.

I claim:

1. A noise reducing foam member which is exposed to ultraviolet radiation without degradation consisting essentially of a major proportion of a room-temperature silicon rubber and minor proportions of a room-temperature curing agent and three ultraviolet stabilizing materials consisting of about 0.8 to 1.7 weight percent carbon black, about 0.4 to 4.3 weight percent 2-(2'-hydroxy-3',5'-di-tert-amylphenyl)benzotriazole and about 4.1 to 4.3 weight percent zinc oxide.

2. A noise-reducing foam member for an exposure lighthouse which is exposed to ultraviolet radiation without degradation consisting essentially of a major proportion of a room-temperature silicone rubber comprising 82.5 to 85.8 weight percent and minor proportions of a curing agent comprising about 8.3 to 8.6 weight percent, zinc oxide comprising about 4.1 to 4.3 weight percent, carbon black comprising about 0.8 to 1.7 weight percent and 2-(2'-hydroxy-3',5'-di-tert-amylphenyl)benzotriazole comprising about 0.4 to 4.3 weight percent.

* * * * *